United States Patent
Takeyama

[11] Patent Number: 6,047,546
[45] Date of Patent: Apr. 11, 2000

[54] OPERATION DEVICE OF A HYDRAULIC MASTER CYLINDER

[75] Inventor: Eiji Takeyama, Nagoya, Japan

[73] Assignee: Aichi Kikai Kogyo Kabushiki Kaisha, Nagoya, Japan

[21] Appl. No.: 09/003,148

[22] Filed: Jan. 6, 1998

[30] Foreign Application Priority Data

Jan. 6, 1997 [JP] Japan ..................................... 9-012049

[51] Int. Cl.⁷ ....................................................... F15B 7/00
[52] U.S. Cl. .................. 60/533; 60/594; 60/545; 92/136
[58] Field of Search .......................... 60/533, 594; 92/136

[56] References Cited

U.S. PATENT DOCUMENTS

| | | | |
|---|---|---|---|
| 3,956,896 | 5/1976 | Bailey | 60/533 X |
| 4,356,736 | 11/1982 | Riedl | 60/533 X |
| 4,653,815 | 3/1987 | Agarwal et al. | |
| 4,872,359 | 10/1989 | Schulz et al. | 92/136 X |

FOREIGN PATENT DOCUMENTS

| | | |
|---|---|---|
| 4320205 | 12/1994 | Germany . |
| 4433824 | 3/1996 | Germany . |
| 2279126 | 12/1994 | United Kingdom . |
| 8903783 | 5/1989 | WIPO . |

*Primary Examiner*—Hoang Nguyen
*Attorney, Agent, or Firm*—Dennison, Meserole, Scheiner & Schultz

[57] ABSTRACT

For an automatic hydraulic pressure generator in which a hydraulic master cylinder driven by a computer-controlled motor lets in or takes out a friction clutch, an operation device is provided that can make the piston rod of the hydraulic master cylinder operate at high torque and at high speed and further that is advantageous in durability of its conversion mechanism from rotary motion to linear motion. The operation device for operating a hydraulic master cylinder by motor drive comprises a slider driven by a motor to rotate around a stationary shaft through an actuator gear train for speed reduction; a female screw formed on an inner circumference of the slider; a male screw provided on an outer circumference of the stationary shaft and meshing with the female screw; a sleeve fixed to a piston rod of the hydraulic master cylinder and being slidable along the stationary shaft in the axial direction; and a slider bearing for coupling the sleeve with the slider so that the sleeve may be rotatable relatively to and movable integrally with the slider in the axial direction.

3 Claims, 1 Drawing Sheet

6,047,546

OPERATION DEVICE OF A HYDRAULIC MASTER CYLINDER

BACKGROUND OF THE INVENTION

1. Field of the Invention

The present invention relates to an operation device for operating a hydraulic master cylinder by motor drive.

2. Prior Art

In a transmission of an automobile, utilization of so-called automatic hydraulic pressure generator is known where a friction clutch is connected or disconnected by a hydraulic master cylinder operated by a computer-controlled motor. In such an automatic hydraulic pressure generator, an operation device for operating a hydraulic master cylinder by a motor is disclosed in DE-A No. 4433824. In the constitution of the operation device, a worm is provided on an output shaft of a motor, and a piston rod of the hydraulic master cylinder is connected by a pin to a worm wheel meshing with the worm. According to such constitution, rotation of the motor is reduced by the worm and the worm wheel and thereby torque is increased. Further, by utilizing the lever ratio due to the difference of the distance between the rotation center of the worm wheel and the connection point of the piston rod and the distance between the rotation center of the worm wheel and the meshing point of the worm and the worm wheel, the torque is increased and the rotary motion of the worm wheel is converted into the linear motion of the piston rod.

However, since the operation device in DE-A No. 4433824 intends to increase the torque utilizing the meshing of the worm and the worm wheel, although large force can be applied to the piston rod, it is disadvantageous that the motion of the piston rod is slow, the hydraulic cylinder can not operate rapidly and the responsibility of control to connect and disconnect the friction clutch is deteriorated.

Further, since the worm and the worm wheel mesh with each other substantially in point contact and the pressure is concentrically applied in the worm axis direction to the meshing point of the worm and the worm wheel, it is disadvantageous that the durability of the worm is liable to deteriorate.

SUMMARY OF THE INVENTION

In order to solve the above-mentioned problems, the invention in claim 1 is an operation device operating a hydraulic master cylinder by motor drive which comprises a slider driven by a motor to rotate around a stationary shaft through an actuator gear train for speed reduction, a female screw formed on an inner circumference of the slider, a male screw provided on an outer circumference of the stationary shaft and meshing with the female screw, a sleeve fixed to a piston rod of the hydraulic master cylinder and being slidable along the stationary shaft in the axial direction, and coupling means for coupling the sleeve with the slider so that the sleeve may be rotatable relatively to and movable integrally with the slider in the axial direction.

In the invention in claim 1, when a motor is driven and a slider is driven to rotate through an actuator gear train for speed reduction, the slider is moved along a stationary shaft in the axial direction by meshing of a female screw of the slider and a male screw on an outer circumference of the stationary shaft. In such motion of the slider in the axial direction, the sleeve integrally combined with the slider is moved in the axial direction, and the piston rod fixed to the sleeve is also moved in the axial direction. Such moving direction of the piston rod can be reversed by reversing the rotation of the motor. Consequently, by moving the piston rod forward or rearward, generating and releasing of the hydraulic pressure can be performed.

In the invention in claim 1, reduction of the motor rotation is performed by the actuator gear train and conversion of the rotary motion into the linear motion is performed by meshing of the female screw of the slider and the male screw on the outer circumference of the stationary shaft. Since any of these performs the power transmission by mutual line contact, the surface pressure of the contact part is low and therefore the durability is improved.

Further, since reduction of the motor rotation is performed by the actuator gear train, the torque can be adjusted desirably by combining gears suitably. Moreover, since the moving speed of the piston rod relative to the rotation of the motor can be adjusted freely by setting pitch of the female screw of the slider and the male screw on the outer circumference of the stationary shaft suitably, the piston rod can be operated at high torque and at high speed.

The embodiment in claim 2 is an operation device of a hydraulic master cylinder as set forth in claim 1, where each of the female screw of the slider and the male screw on the outer circumference of the stationary shaft is a trapezoidal multiple thread screw. Since each of the female screw and the male screw is made a trapezoidal thread screw, intensity of the female screw and the male screw is increased, and since it is made a multiple thread screw, the moving speed of the piston rod relative to the rotation of the motor can be increased.

The embodiment in claim 3 is an operation device of a hydraulic master cylinder as set forth in claim 1, where the outer circumference of the slider and the outer circumference of the sleeve are slidablly supported on a case of the operation device through a bearing, and the coupling means for coupling the sleeve with the slider so that the sleeve may be rotatable relatively to and movable integrally with the slider in the axial direction includes a slider bearing, and materials or parts requiring no oiling during the operation are used in the bearing, the slider bearing, each gear of the actuator gear train, the male screw and the female screw.

As a result, the operation device as a whole can be constituted in a dry type, and there are advantages that maintenance is not required and the oil leakage is not produced.

DESCRIPTION OF THE PREFERRED EMBODIMENT

Figure 1:
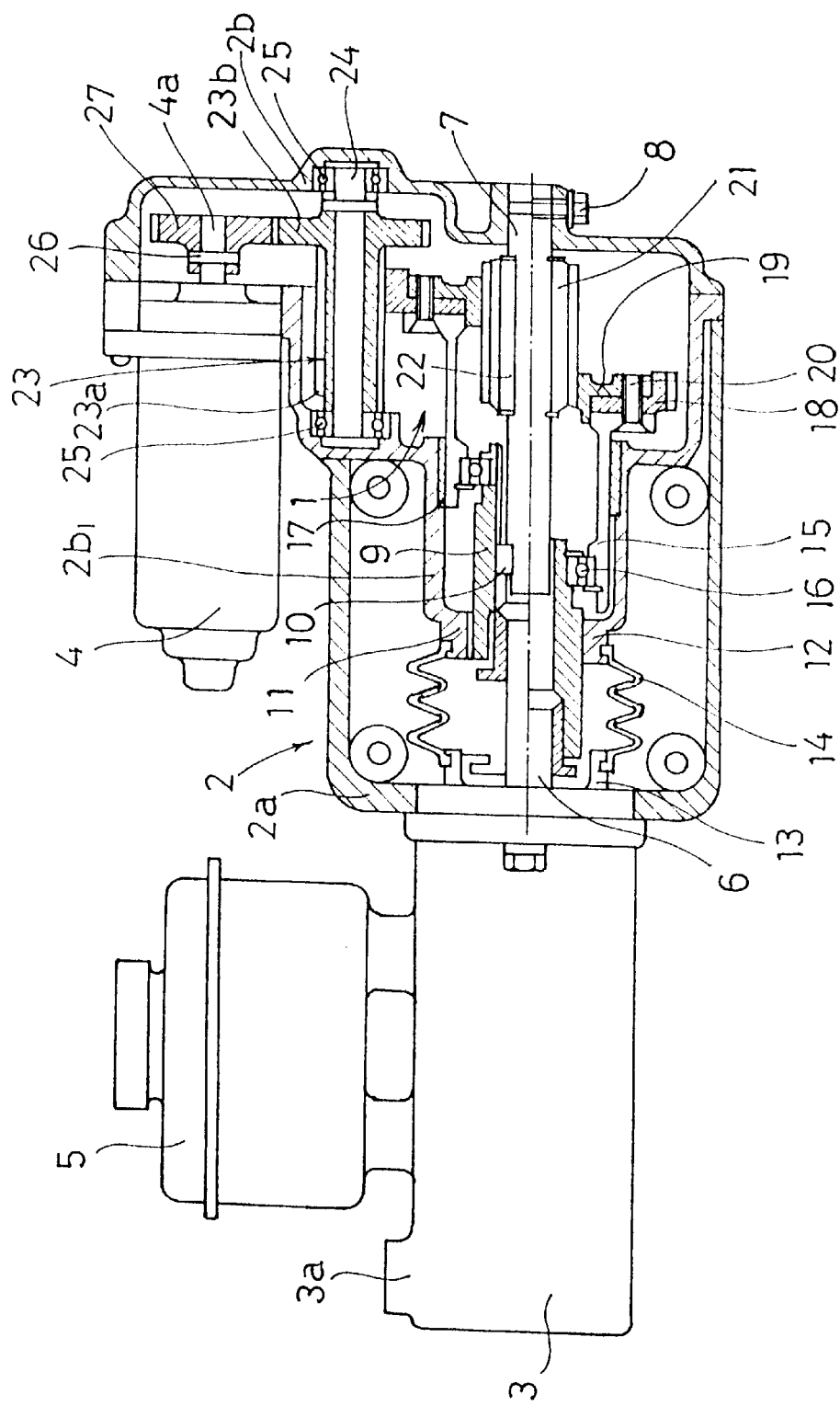
FIG. 1 is a sectional view of an automatic hydraulic pressure generator utilizing an operation device according to an embodiment of the invention.

An embodiment of the present invention will be described in detail referring to FIG. 1 hereinafter. FIG. 1 shows an automatic hydraulic pressure generator in a transmission of an automobile where a friction clutch (not shown) is connected or disconnected by computer control.

The automatic hydraulic pressure generator comprises an operation device 1 in this embodiment, a case 2 enclosing the operation device 1, a hydraulic master cylinder 3 mounted on the front side of the case 2, and a motor 4 mounted on the upper side of the case 2. Also, a reservoir tank 5 is connected and arranged on the upper side of the hydraulic master cylinder 3.

The motor 4 can be rotated forward and backward and is driven and controlled by a computer (not shown).

Also, the hydaulic master cylinder 3 has a connection part 3a communicating with the piping for an operating cylinder of a friction clutch (not shown). Structures of the motor 4 and the hydraulic master cylinder 3 themselves are known well, and when a piston rod 6 of the hydraulic master cylinder 3 is moved forward through the operation device 1 by drive of the motor 4, the hydraulic master cylinder 3 generates hydraulic pressure and supplies it to the operating cylinder, and when the piston rod 6 is moved rearward, the hydraulic pressure is released.

Next, the constitution of the operation device 1 will be described. The case 2 is constituted by a front case 2a and a rear case 2b, and the rear case 2b has a cylindrical part 2b1 partially projecting in the front case 2a. Within the front case 2a, the piston rod 6 is projected from the front side, and a stationary shaft 7, coaxial and opposite to the piston rod 6, is fixed to the rear case 2b through a fixing screw 8 and is positioned within a cylindrical part 2b1 of the rear case 2b.

On the front side of the stationary shaft 7, a sleeve 9 is mounted slidablly and rotatablly in the axial direction through a slide key 10, and the front end of the sleeve 9 is tightened and fixed to the bulged rear end of the piston rod 6 through a flared nut 11. Also, on the inner circumference the front side of the cylindrical part 2b1 of the rear case 2b, a bearing 12 slidably engaging with the outer circumference of the sleeve 9 is mounted. Also, a bellow-shaped cover 14 is mounted between the front end of the cylindrical part 2b1 and an annular flange 13 formed on the inner wall of the front case 2a opposite to the cylindrical part 2b1, and the coupling part of the sleeve 9 and the piston rod 6 is shielded by the cover 14.

Within the cylindrical part 2b1 of the rear case 2b, the front end of a slider 15 is coupled with the rear end part of the sleeve 9 so as to be rotatable relatively to and movable integrally with the sleeve 9 in the axial direction through a slider bearing 16 comprising a ball bearing. That is, the rear end part of the sleeve 9 is fixed to an inner race of the slider bearing 16 and the front end of the slider 15 is fixed to an outer race of the slider bearing 16. The slider bearing 16 corresponds to "coupling means for coupling said sleeve with said slider so that said sleeve may be rotatable relatively to and movable integrally with said slider in the axial direction" in claim 1. Also, the outer circumference of the slider 15 is guided by a bearing 17 mounted on the inner circumference of the cylindrical part 2b1.

At the rear side of the slider 15, a slider side actuator gear 18 having outer circumferential teeth and a female screw member 19 with a female screw formed on the inner circumference are fixed in overlaid state in the axial direction by screws 20–20 (only one is shown in the FIGURE). Also, at the rear part of the stationary shaft 7 positioned in the inside of the female screw member 19, a male screw member 21 meshing with the female screw member 19 is fixed not to be rotatable through a fixing key 22.

On the upper side of the slider side actuator 18, a counter side actuator gear 23 is positioned. The counter side actuator 23 is mounted on a counter shaft 24 in parallel to the stationary shaft 7, and the counter shaft 24 is supported at both ends on the rear case 2b through ball bearings 25, 25. The counter side actuator 23 comprises a first gear part 23a meshing with the slider side actuator gear 18 and a second gear part 23b of larger diameter with teeth more in number than the first gear part 23a. Length of the first part 23a (length in the axial direction) is formed longer than that of the slider side actuator gear 18 and thereby the slider 15 can be moved in the axial direction as described later. Also, the second gear part 23b meshes with a motor side actuator gear 27 mounted on the motor shaft 4a of the motor 4 through a spring 26 and having teeth less in number than the second gear part 23b. The motor side actuator gear 27, the counter side actuator gear 23 and the slider side actuator gear 18 constitute actuator gear train which reduces rotation of the motor 4 and transmits the reduced rotation to the slider 15.

Next, function in the above-mentioned embodiment will be described. In addition, in FIG. 1, the piston rod 6, the sleeve 9 and the slider 15 are shown in upper half in the position that the piston rod 6 is moved rearward and in the oil hydraulic pressure release state (rearward moving position) and in lower half in the position that the piston rod 6 is moved forward and in the oil hydraulic pressure generating state (forward moving position). Description will be performed based on the initial state that the piston rod 6 is moved rearward and in the oil hydraulic pressure release condition.

First, when the motor 4 is started, rotation of the motor 4 is reduced by the actuator gear train comprising the motor side actuator gear 27, the counter side actuator gear 23 and the slider side actuator gear 18 and the reduced rotation is transmitted to the slider 15. Then, by meshing of the female screw member 19 fixed to the slider 15 and the male screw member 21 of the stationary shaft 7, the slider 15 attendant on the rotation is moved forward with respect to the stationary shaft 7 (to the left in the FIGURE), and together with the slider 15, the sleeve 9 and further the piston rod 6 are moved forward and attain to the forward moving position shown in lower half and the oil hydraulic pressure is generated in the hydraulic master cylinder 3.

Next, in order that the oil hydraulic pressure generating state is transferred to the oil hydraulic pressure release state, the motor 4 is rotated in the direction reverse that described above. Then, the slider 15 is moved rearward with respect to the stationary shaft 7 (to the right in the FIGURE), and together with the slider 15, the sleeve 9 and further the piston rod 6 are moved rearward and the oil hydraulic pressure release state is produced.

As described above, in this embodiment, reduction of rotation of the motor 4 is performed by the actuator gear train and conversion of the rotatary motion into the linear motion is performed by meshing of the female screw member 19 of the slider 15 and the male screw member 21 of the stationary shaft 7. Since any of these performs the power transmission by mutual line contact, the surface pressure of the contact part is low and therefore the durability is improved. Particularly, since each of the female screw member 19 and the male screw member 21 of the stationary shaft is made a trapezoidal thread screw, the intensity can be improved.

Further, since the speed reduction of the motor 4 is performed by the actuator gear train, the number of teeth in the gear or the number of the gears themselves is set suitably, and thereby the desired torque can be obtained.

Since the moving speed of the piston rod 6 relative to the rotation of the motor 4 can be adjusted freely by setting pitch of the female screw member 19 of the slider 16 and the male screw member 21 of the stationary shaft 7 suitably, the piston rod 6 can be operated at high torque and at high speed. Particularly, if the female screw member 19 and the male screw member 21 are made multiple thread screws, the moving speed of the piston rod 6 relative to the rotation of the motor 4 can be increased, and in combination with constitution of the trapezoidal thread screw as above described, the increase of the moving speed and the improvement of the durability can be achieved simultaneously.

Further, each of the motor side actuator gear 27, the counter side actuator gear 23 and the slider side actuator gear 18 as above described may be formed by nylon resin, and material of the female screw member 19 and the male screw member 21 of the stationary shaft 7 may be brass and carbon steel respectively, and material of the slide key 10 may be polyimide resin, and material of bearings 12, 17 slidably contacting with the outer circumference of the sleeve 9 and the outer circumference of the slider 15 may be PTFE resin. It is preferable that the slider bearing 16 coupling the sleeve 9 being rotatable relatively with the slider 15 further the ball bearings 25, 25 of the counter shaft 24 are made grease infusion type, and thereby the operation device 1 is constituted in a dry type. As a result, there are advantages that maintenance is not required and the oil leakage is not produced in the operation device 1.

In addition, in the embodiment as described above, although the slider 15 and the female screw member 19 are constituted separately and also the stationary shaft 7 and the male screw member 21 are constituted separately, the slider 15 itself may have a female screw and also the stationary shaft 7 itself may have a male screw.

What is claimed is:

1. An operation device for operating a hydraulic master cylinder by motor drive, comprising:

a slider driven by a motor to rotate around a stationary shaft through an actuator gear train for speed reduction;

a female screw formed on an inner circumference of said slider;

a male screw provided on an outer circumference of said stationary shaft and meshing with said female screw;

a sleeve fixed to a piston rod of said hydraulic master cylinder and being slidable along said stationary shaft in the axial direction; and coupling means for coupling said sleeve with said slider so that said sleeve may be rotatable relatively to and movable integrally with said slider in the axial direction.

2. An operation device of a hydraulic master cylinder as set forth in claim 1, wherein each of the female screw of said slider and the male screw on the outer circumference of said stationary shaft is a trapezoindal multiple thread screw.

3. An operation device of a hydraulic master cylinder as set forth in claim 1, wherein the outer circumference of said slider and the outer circumference of said sleeve are supported slidable on a case of the operation device through a bearing, said coupling means for coupling said sleeve with said slider so that said sleeve may be rotatable relatively to and movable integrally with said slider in the axial direction includes a slider bearing, and materials or parts requiring no oiling during the operation are used in said bearing, said slider bearing, each gear of said actuator gear train, said male screw and said female screw.

* * * * *